EYELET

Filed Nov. 8, 1960

INVENTOR.
ARTHUR C. ANSLEY
BY Albert Sperry
ATTORNEY

③ United States Patent Office 3,103,547
Patented Sept. 10, 1963

3,103,547

EYELET

Arthur C. Ansley, Solebury Township, Bucks County, Pa., assignor to Arthur Ansley Manufacturing Company, Solebury Township, County of Bucks, Pa., a corporation of Pennsylvania Filed Nov. 8, 1960, Ser. No. 68,116
2 Claims. (Cl. 174—68.5)

Figure 1:
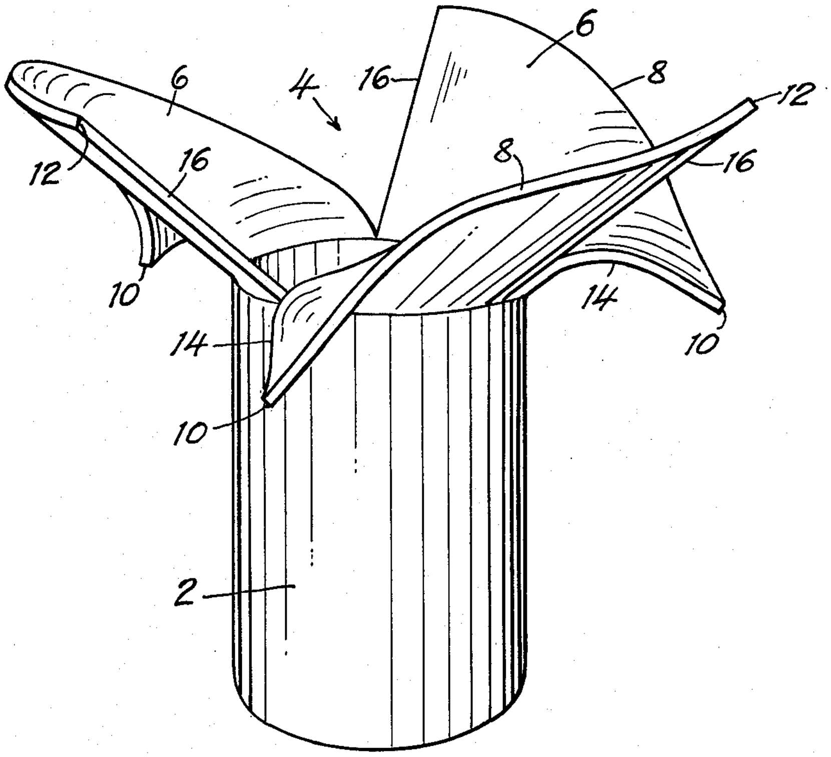

This invention relates to eyelets adapted for establishing an electrical connection between circuit elements. The invention is particularly adapted for use with printed circuit boards wherein it may be used to provide an electrical connection between a circuit element on one face of such a board and a circuit element on the opposite face thereof. The invention is nevertheless adapted for use wherever an eyelet is employed for securing one conductor element to another.

Printed circuit boards usually embody a sheet, plate or board formed of electrically insulating material and have electrically conducting elements carried by or secured in place on one or both surfaces of the board. When it is desired to establish an electrical connection between elements on opposite surfaces of the board, an opening or hole is made through the insulating material and through or adjacent to the electrical elements to be connected. An electrical connection is then established through the hole by employing either a plating operation or an eyelet. Eyelets may also be employed for securing or reinforcing the connection between a wire or other conductor and one or both sides of a printed circuit or when securing any electrical elements together.

In making any such connections heretofore, the differences in expansion of elements such as the insulating material and the eyelet or other metallic connecting means frequently give rise to imperfections in the connections established. This is particularly true if a dip-soldering operation is employed since the changes in temperature are then quite sudden and radical and extend throughout the entire area of the board. Moreover, expansion and contraction or other movement of the eyelet relative to the solder when the solder cools and solidifies tend to cause the solder to crystallize or become granular producing fissures or other minute discontinuities which impair the contact. If the eyelet has a head in the form of a rolled collar, air or fluxing agent may be trapped in the space about the head of the eyelet and beneath the collar so as to create a microscopic crack or discontinuity in the soldered connection. In some cases the eyelet is provided with a tapered or funnel flange on one or both ends to permit more ready flow of solder into the space adjacent the eyelet head. However, even then the connection established is not always perfect.

In accordance with the present invention, these objections and limitations of the eyelets of the prior art are overcome and a new type of eyelet provided is one which assures effective contact of the eyelet with the conducting elements to which it is applied. These advantages are preferably attained by providing one or both ends of a metal eyelet with a head having resilient or yieldable contact means designed to press against the conducting elements on the face of the plate while permitting sufficient relative movement of the eyelet with respect to the insulating plate or other element to allow for differences in expansion of the metal eyelet and the insulating material. At the same time, the head of the eyelet is preferably formed in such a way as to assure the most effective contact and flow of solder into engagement with the eyelet and the electrical elements to be connected.

Accordingly, the principal object of the present invention is to provide a novel type of metal eyelet which serves to increase the reliability of the contact established between electrical elements.

A further object of the invention is to provide an eyelet with a head having contact means thereon which are sufficiently yieldable to establish and maintain a positive electrical contact with circuit elements on a printed circuit board or elsewhere despite differences in expansion of the eyelet and the material to which it is applied.

Another object of the invention is to provide an eyelet with means on the head thereof which not only assure effective electrical contact between the eyelet and an electrical element but also facilitate the flow of solder beneath outwardly extending portions of the head and into contact with the eyelet and electrical element.

These and other objects and features of the present invention will appear from the following description thereof wherein reference is made to the figures of the accompanying drawing.

Figure 2:
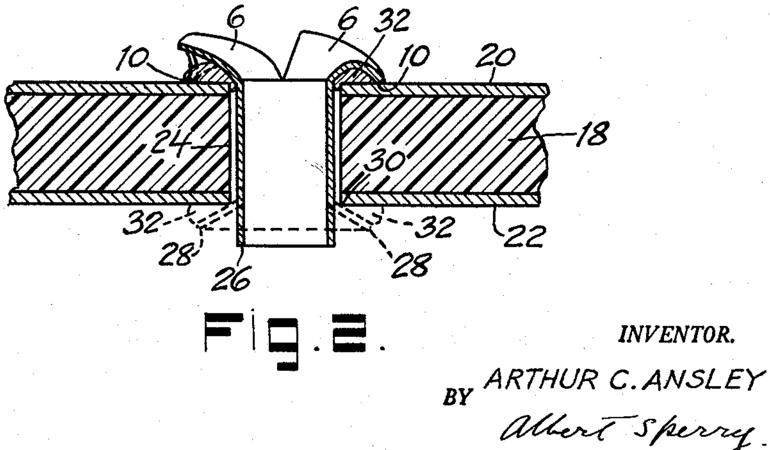

In the drawing:

FIG. 1 is a perspective illustrating a typical eyelet embodying the present invention; and FIG. 2 is a sectional view through a circuit board having the eyelet of FIG. 1 applied thereto.

In that form of the invention chosen for purposes of illustration in the drawing, the eyelet has a cylindrical tubular body 2 of sufficient length to extend through and beyond the surfaces of the printed circuit board or other element to which it is to be applied. The head 4 of the eyelet is provided with a plurality of outwardly and downwardly turned segments 6. The segments 6 are preferably tilted with respect to the body in a circumferential direction so that the outer edge 8 of the segment is inclined circumferentially and with respect to the axis of the eyelet. The corner 10 of each segment is thus positioned below the corner 12 and the radially extending side 14 of the segment is curved in such a way that the extremity thereof is inclined downwardly or at an angle of more than 90° with respect to the axis and side walls of the body of the eyelet. At the same time, the opposite radially extending side 16 of the segment 6 is inclined outwardly and upwardly at an angle less than 90° with respect to the axis and side walls of the body of the eyelet.

The eyelet thus provided may be assembled with a printed circuit board as shown in FIG. 2. As there shown, the board is formed of a sheet of insulating material 18 having an electrically conducting circuit element 20 on the upper face thereof and an electrically conducting circuit element 22 on the lower face thereof. A hole 24 is formed through the board adjacent the circuit elements 20 and the eyelet extends through this hole.

The eyelet is preformed as shown in FIG. 1 with the head 4 and the tubular body 2. Then when the tubular body is inserted into the hole 24 in the board, the corners 10 of the segments 6 on the head 4 of the eyelet engage the conducting element 20 on the upper face of the board. The lower end of the tubular body 2 of the eyelet projects below the lower surface of the board as shown at 26 in FIG. 2. The lower end of the body 2 may thereafter be turned outward to the dotted line position 28 of FIG. 2 to form a funnel type flange on the lower end of the eyelet. This spreading or forming of the lower end 26 of the eyelet body serves to cause the flaring portions 28 to press against the corners 30 of the hole 24 to draw the body of the eyelet downward pressing the corners 10 of the segments 6 of the head into forcible engagement with the upper conducting element 20 on the board 18.

If preferred, the lower end 26 of the body of the eyelet may be spread outward and shaped in a manner to form a lower head on the eyelet which has segments thereon that are turned similar to those on the upper head 4. Further, if desired, the lower end of the eyelet may be rolled or otherwise formed to draw the body of the eyelet downward and establish positive contact between the heads on the opposite ends of the eyelet and the conducting elements on the opposite faces of the insulating board.

In any event, when the eyelet is applied to a printed board, the corners 10 of the segments 6 establish a positive spring contact with the conducting elements of the board before any solder is applied. Moreover, the segments are sufficiently yieldable to maintain an effective electrical contact of the heads with the elements 20 and 22 while allowing the metal of the eyelet to expand and contract independently of the insulating material 18 of which the body of the board is made.

In most of the uses of the eyelet, it is anticipated that solder 32 will be applied about the heads 4 and 28. The solder may be applied by a dipping operation or otherwise. During the application of the solder, the elevated corners 12 and the inclined outer edges 8 of the segments 6 permit ready flow of the solder beneath the segments and into direct contact with the body 2 of the eyelet and the conducting elements 20 and 22 engaged by the heads formed on the tubular body. In this way, the segments 6 serve to assure the most effective soldered connection between the eyelet and the conducting elements while at the same time establishing a positive spring contact therebetween. The tilted or inclined positioning of the outer edges of the segments 6 also permits ready flow of cleaning and fluxing agents into and out of contact with the surfaces to be soldered in any preparatory treatment of the assembly.

The method and means employed for producing the eyelets can, of course, be varied and chosen to produce eyelets of great accuracy at high speed from tubing or sheet material. The eyelets can, of course, be formed to provide the head with any desired number of segments or yieldable contacting means and while segments may be formed on both ends of the tubular body of the eyelet, it is generally preferable to form the lower end of the eyelet with a funnel form of head as shown at 28 in FIG. 2. It may, nevertheless, be expanded or otherwise shaped in any suitable way to secure the eyelet in place and cause the corners 10 of the segments 6 on the head 4 of the eyelet to engage and bear firmly against the conducting element 20 on the adjacent surface of the printed board.

The spring or yielding connection resulting from the use of eyelets of the present invention also serves to diminish or prevent cracking of the board adjacent the holes therein upon application of the eyelet. Thus, even though the boards vary in thickness from each other or from point to point in the same board, the dies or tools used to form the lower head 28 on the eyelet can be set to operate uniformly without danger of damaging the insulating boards.

Either or both of the heads of the eyelet may engage and secure conducting elements together. Moreover, the eyelet may be employed to secure a lead-in wire or connection to an element of a printed circuit or to any other member as by passing the wire into or through the tubular body 2 of the eyelet and soldering it in place. In any case, the head of the eyelet will serve to permit the ready flow of solder beneath the segments of the head and into effective contact with the elements of a printed circuit or other member to which the eyelet is applied. It will, therefore, be apparent that eyelets embodying the present invention have many uses and applications in electrical circuitry and may be constructed and shaped in various ways to assure an effective and permanent electrical connection between conducting elements. They may be made of hard brass, copper, Phosphor bronze or any other suitable or preferred metal or alloy.

I claim:

1. The combination comprising a sheet of insulating material having electrically conducting elements positioned on opposite faces of said sheet adjacent an opening in the sheet, and means establishing an electrical connection between said electrically conducting elements including an eyelet formed of resilient metal and having a tubular body extending through the opening in the sheet of insulating material, one end of the tubular body of the eyelet being provided with a plurality of segments projecting outwardly from the body and over the electrically conducting element on the adjacent face of said sheet, each of said segments presenting a peripheral edge which is circumferentially inclined and having opposite radially extending side edges positioned at differ-angles with respect to the axis of said tubular body, one of said side edges of each segment being inclined at an angle of more than 90° with respect to the axis of the tubular body and including a portion yieldably contacting the conducting element on the adjacent surface of the sheet of insulating material, the opposite side edge of each segment being spaced from the adjacent conducting element, and such space being at least partially occupied by solder establishing an electrical connection between the eyelet and said adjacent electrical element, the opposite end of the tubular body of the eyelet projecting beyond the opposite face of the sheet of insulating material and being electrically connected to the electrically conducting element on said opposite face of the sheet of insulating material.

2. An eyelet for use in establishing either a mechanical, or a soldered connection, or both, with an electrical element located on one face of a sheet of material adjacent an opening in the sheet, said eyelet being formed of resilient metal and having a tubular body designed to be passed through such an opening in a sheet of material, one end of said tubular body being provided with a head embodying a plurality of segments which extend outwardly from said end of the body so as to project over an element located adjacent the body of the eyelet, each of said segments having radially extending edges at opposite sides thereof which are inclined at different angles with respect to the axis of the body of the eyelet, one of said side edges of each segment curving upwardly, outwardly and downwardly away from said body so that the outer extremity of one side of the segment is inclined at an angle of more than 90° with respect to said axis and serves to provide a corner portion which will project toward an electrical element located adjacent the body of the eyelet for establishing a mechanical connection therewith, the opposite side edge of each of said segments being inclined at an angle of less than 90° with respect to said axis whereby the outer peripheral edge of each segment will be circumferentially inclined to facilitate the flow of solder beneath the segment and into contact with the lower surface of said segment and with the upper surface of an element located adjacent said body.

References Cited in the file of this patent

UNITED STATES PATENTS

| | | |
|---|---|---|
| 1,912,653 | Olson | June 6, 1933 |
| 2,915,678 | Frazier et al. | Dec. 1, 1959 |
| 2,946,039 | Grunwald et al. | July 19, 1960 |
| 2,997,680 | Arthur | Aug. 22, 1961 |